US007849411B1

(12) United States Patent　　(10) Patent No.: US 7,849,411 B1
George et al.　　(45) Date of Patent: Dec. 7, 2010

(54) ENABLING PARTICIPATION IN AN ONLINE COMMUNITY USING VISUAL MACHINE-READABLE SYMBOLS

(75) Inventors: John-Alistair George, San Rafael, CA (US); Adam Connelly, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 746 days.

(21) Appl. No.: 11/755,691

(22) Filed: May 30, 2007

Related U.S. Application Data

(60) Provisional application No. 60/803,501, filed on May 30, 2006, provisional application No. 60/803,506, filed on May 30, 2006.

(51) Int. Cl.
*G06F 3/00* (2006.01)
(52) U.S. Cl. .................. 715/758; 715/733; 715/753; 709/204

(58) Field of Classification Search .................. 715/733, 715/751, 752, 753, 758, 764, 765, 835, 864, 715/205; 709/203, 204
See application file for complete search history.

(56) References Cited

U.S. PATENT DOCUMENTS

| | | | | |
|---|---|---|---|---|
| 7,089,487 | B2 * | 8/2006 | Tsai | 715/208 |
| 7,599,844 | B2 * | 10/2009 | King et al. | 705/1 |
| 2003/0051003 | A1 * | 3/2003 | Clark et al. | 709/218 |
| 2006/0029296 | A1 * | 2/2006 | King et al. | 382/313 |
| 2008/0301561 | A1 * | 12/2008 | Bain | 715/730 |

\* cited by examiner

*Primary Examiner*—X. L Bautista
(74) *Attorney, Agent, or Firm*—Perkins Coie LLP

(57) ABSTRACT

A facility for coordinating an online discussion is described. The facility receives an indication that a user has captured a machine-readable symbol encoding an identifier that identifies a particular online discussion. In response, the facility incorporates into an online forum that hosts this online discussion an indication that this user captured a symbol encoding an identifier that identifies this online discussion.

27 Claims, 25 Drawing Sheets

CREATE YOUR PROFILE

Your Registration Confirmation Code will be sent as an SMS* to the phone number entered below.

Information collected here will only be used by smartpox.com and will never be sold or shared with any 3rd party vendors.

*Wireless carriers may charge fees for receiving text messages.

REQUIRED STUFF

- User Name _____ (12 chars remaining) — 101
- Password _____ (12 chars remaining) — 102
- Confirm password _____ (12 chars remaining) — 102
- eMail address _____ (40 chars remaining) — 103
- eMail display Make my email address visible to fellow Smartpox users? ● No ○ Yes } 104
- Mobile # _____ (Required for sign up confirmation.) } 105
- Mobile carrier [Please Select Your Mobile Carrier ▼] — 106
- Choose a locale [Please Select a Locale ▼] (Your closest major city) — 107
- Agreement: I have read and accept the following Terms and Conditions ☐ Yes — 108

[Generate Confirmation Code] — 109

OPTIONAL STUFF — 110

- Choose a photo _____ [Browse]

ENABLING PARTICIPATION IN AN ONLINE COMMUNITY USING VISUAL MACHINE-READABLE SYMBOLS

CROSS-REFERENCE TO RELATED APPLICATIONS

This application claims the benefit of U.S. Provisional Application Nos. 60/803,501, filed May 30, 2006, and 60/803,506, filed May 30, 2006, each of which is hereby incorporated by reference in its entirety.

TECHNICAL FIELD

The described technology is directed to the field of techniques for building and supporting online communities.

BACKGROUND

While online communities are becoming increasingly popular, members of conventional online communities tend to participate in them almost exclusively by accessing a web site provided by the online community using a web browser. This mode of participation can tend to limit the usefulness of and level of interest in conventional online communities.

In view of the foregoing, techniques for participating in an online community by performing interactions in the real world would have significant utility.

BRIEF DESCRIPTION OF THE DRAWINGS

FIGS. 1-23 are user interface diagrams showing typical displays presented the by facility as part of the community web site.

DETAILED DESCRIPTION

Figure 2:
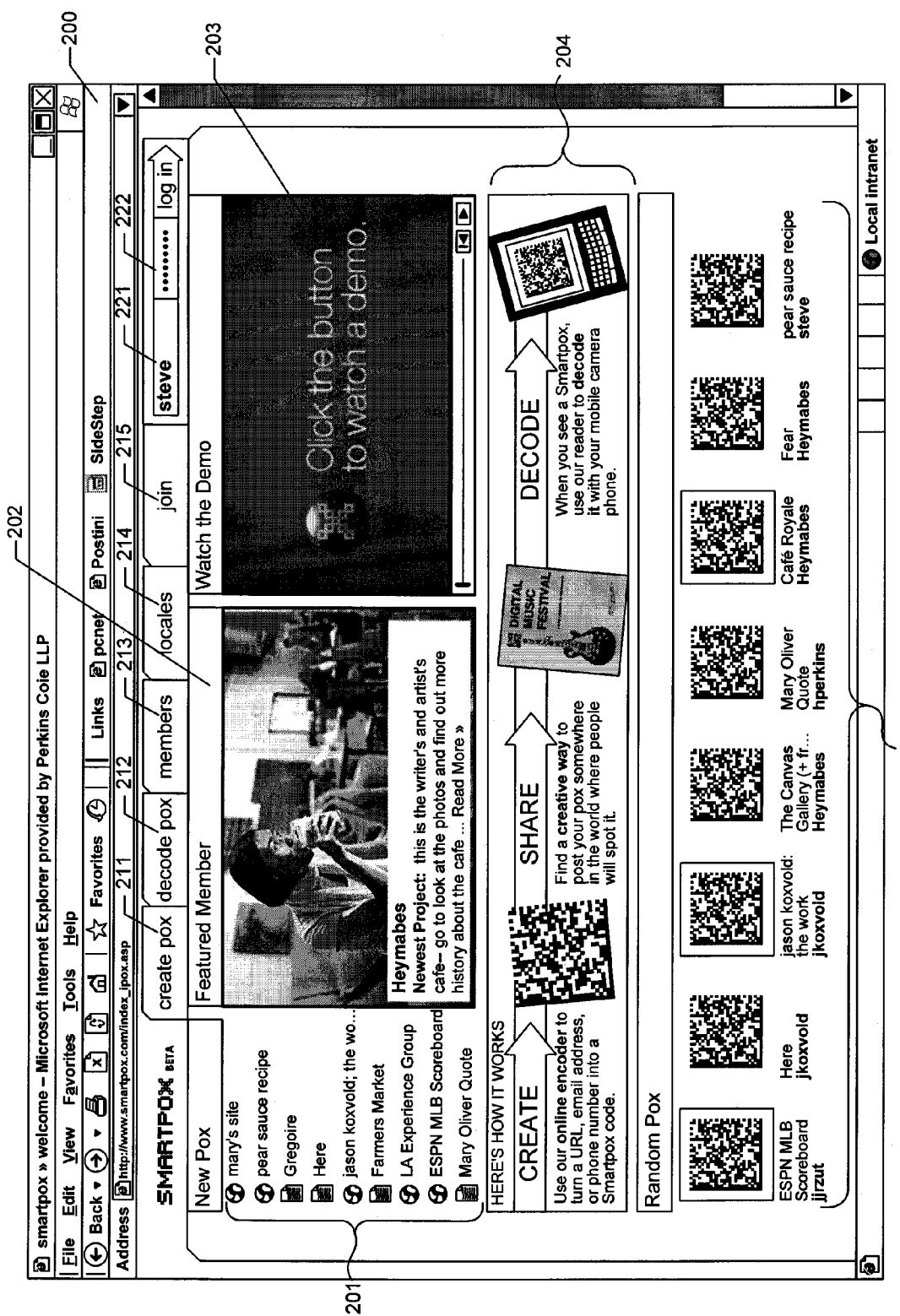

A software and/or hardware facility that enables participation in an online community using visual machine-readable symbols ("the facility") is described. In some embodiments, users of the community can interact with a community website to create content items that are available to some or all members of the community. For example, users may create restaurant reviews, musical artist descriptions, songs, documents, or virtually any other textual, graphical, audio, video, or other content. For each created content item, the facility assigns an identifier that uniquely identifies the content item among all of the content items created in the community, generates a two-dimensional barcode encoding the identifier, and permits the creating user to print out the barcode, and/or incorporate the barcode into a larger document that can be printed. For example, a user may create a restaurant review document for a restaurant, and tape a printed copy of the resulting barcode to the doorframe of the restaurant, or create a description of a band and incorporate the assigned barcode into a poster announcing an upcoming performance by the band.

When another user of the community encounters such a printed barcode, s/he can use an application installed on his or her cameraphone to optically capture and decode the barcode, communicate the user's capture of the barcode to a server, and optionally download the content item to the phone. In some embodiments, the server maintains a count and/or list of users who have captured each barcode. When the capturing user later visits the collaboration website, s/he can select the content item from a list of all of the content items whose barcodes the user has captured and display and interact with the content item, such as by commenting on it, annotating it, etc.

In some embodiments, the facility enables a user to encode other types of information into a barcode that can be read and decoded by the facility's cameraphone application. For example, a first user may encode a phone number into a barcode. When this barcode is captured by a second user's cameraphone, the cameraphone can call the encoded phone number. The first user may similarly encode an email address that the second user's cameraphone can use to address an email message.

In some embodiments, the facility displays advertising messages to a user, either on the user's cameraphone or within the context of the community web site, that are targeted based at least in part upon the set of symbols captured by the user.

In some embodiments, the facility supports a number of other special-purpose symbols, such as a symbol that a user may capture in order to add his or her email address to an email list, or otherwise join a discussion group about a particular subject. Also, in some embodiments, a user may capture a symbol from a shelf tag for an item at a store to receive a coupon for that item. In some cases, the facility can encode information into a symbol that is displayed on the display of a smart phone, such as a symbol encoding a coupon redemption code.

By performing in some or all of the ways described above, the facility enables the community to incorporate real-world interactions into the participation of users in the community.

FIGS. 1-23 are user interface diagrams showing typical displays presented the by facility as part of the community web site.

FIG. 1 shows a display presented by the facility in order to register a new user for the community. The display 100 includes user interface controls for entering information such as the following: a user name 101 used to identify the user; a password 102 used by the user to authenticate his or her identity to the facility; an email address 103 at which the user can receive email directed to the user; an indication 104 about whether the facility may share this email address with other users of the facility; a telephone number 105 for the user's smart phone; a mobile carrier 106 that provides wireless service to the cell phone; a geographic locale 107 in or near which the user resides or frequently visits; an indication 108 that the user has read agreements relating to the use of the facility; and a photo 110 portraying the user. After entering this information, the user selects control 109 in order to create a profile.

In response, the facility generates a confirmation code and transmits it to the user's cameraphone, such as in a text message or a voicemail message. When the user receives the confirmation code on his or her cameraphone, the user enters it into a subsequent display generated by the facility (not shown) to complete the creation of the user's profile.

In many cases, the user proceeds to use the community web site to download a symbol capture and processing program for installation on the user's smart phone. As part of the installation of this program, the user's user name or another identifier for the user is solicited from the user, and stored in a location in the cameraphone that is accessible to the capture program.

FIG. 2 shows a display presented by the facility to a member of the community containing the community's homepage. The homepage 200 has sections listing new discussions ("pox" or "smartpox") 201, identifying a featured member 202, presenting a web site demonstration video 203, showing a graphical community primer 204, and a list of randomly-selected discussions 205. The homepage also contains links that the user can follow to create a new discussion 211, learn how to capture and decode symbols 212, list members of the community 213, list different geographic areas in which the community is operative 214, and join the community 215. The user may also type a user ID 221 and password 222 into a login control in order to log in to the web site.

Figure 3:
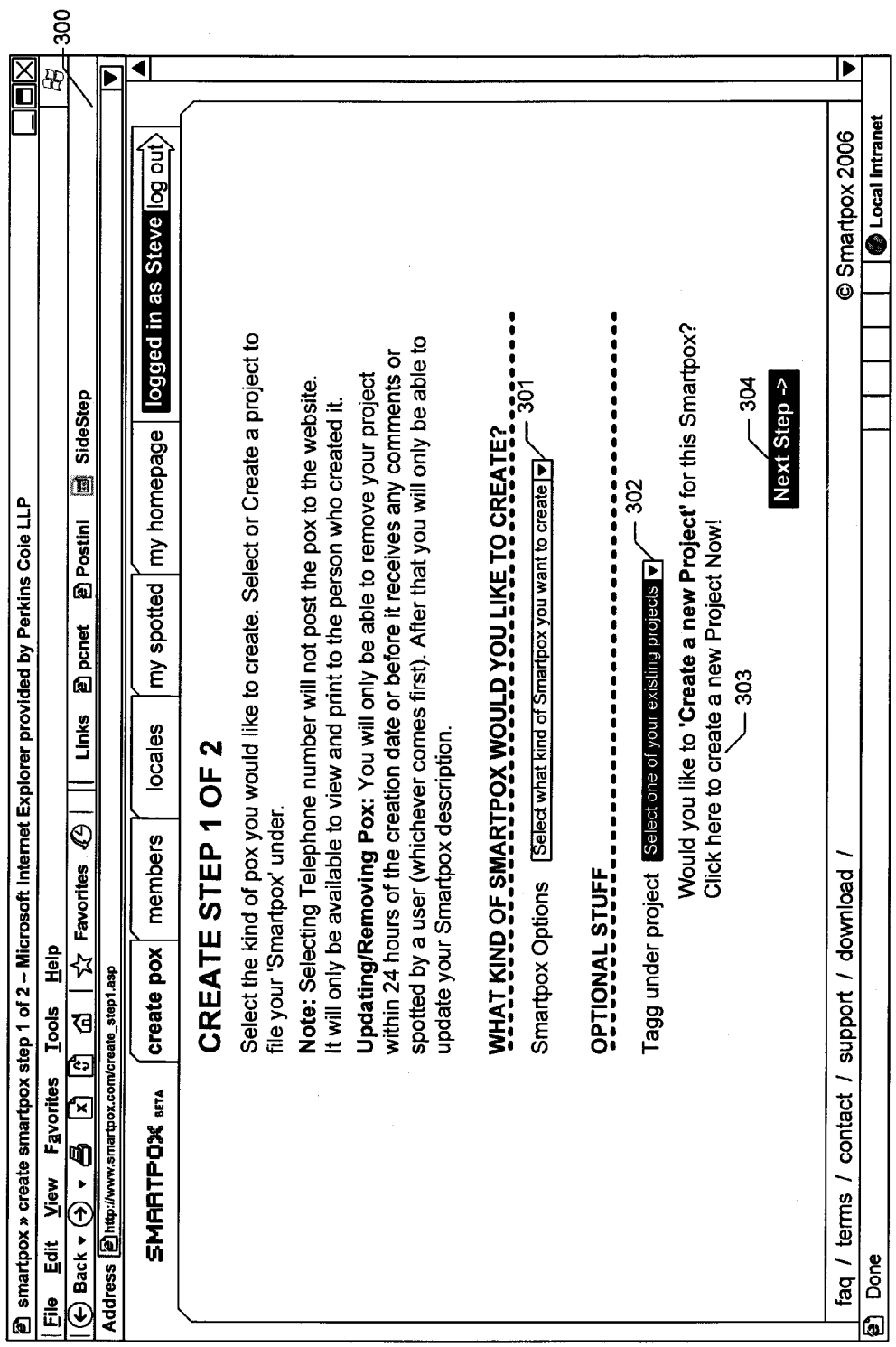

FIG. 3 shows a display presented by the facility when the user selects the "create pox" link to create a new discussion. This display 300 contains controls that the user may use in order to select a type of content for the discussion ("smart pox options") 301, select a group of discussions (a "project") 302 to which to add the new discussion, a create a new project 303, or proceed to the next step of the process of creating a new discussion 304.

Figure 4:
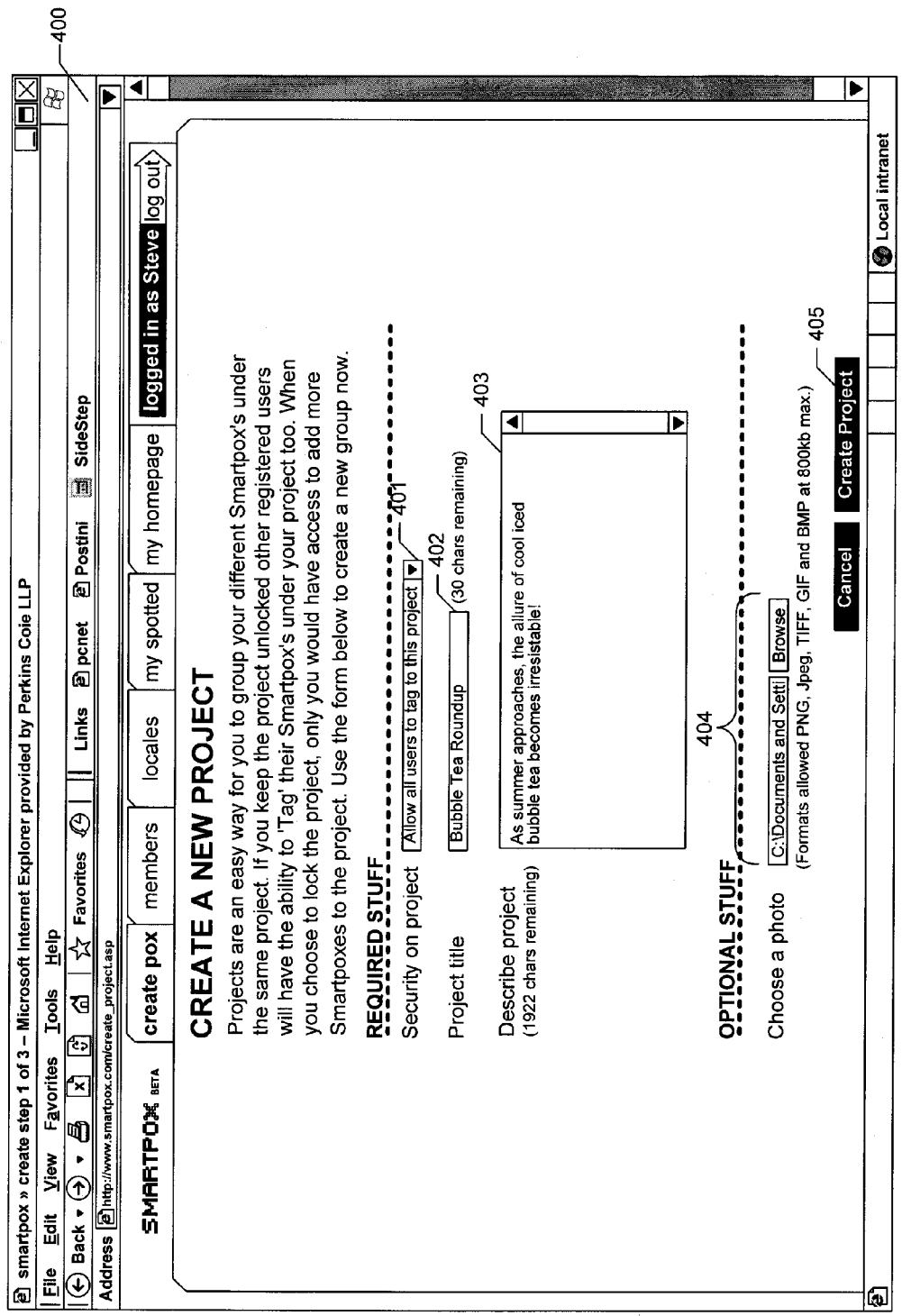

FIG. 4 shows a display presented by the facility when the user selects the "create a new project" link in the display of FIG. 4. The display 400 contains controls usable by the user to enter information about the project including whether all users can add discussions to this project ("security on a project") 401, the title of the project 402, a description of the project 403, and an image that visually represents the project 404. The display further includes a button 405 that the user can select in order to create a project with the attributes specified using the controls.

Figure 5:
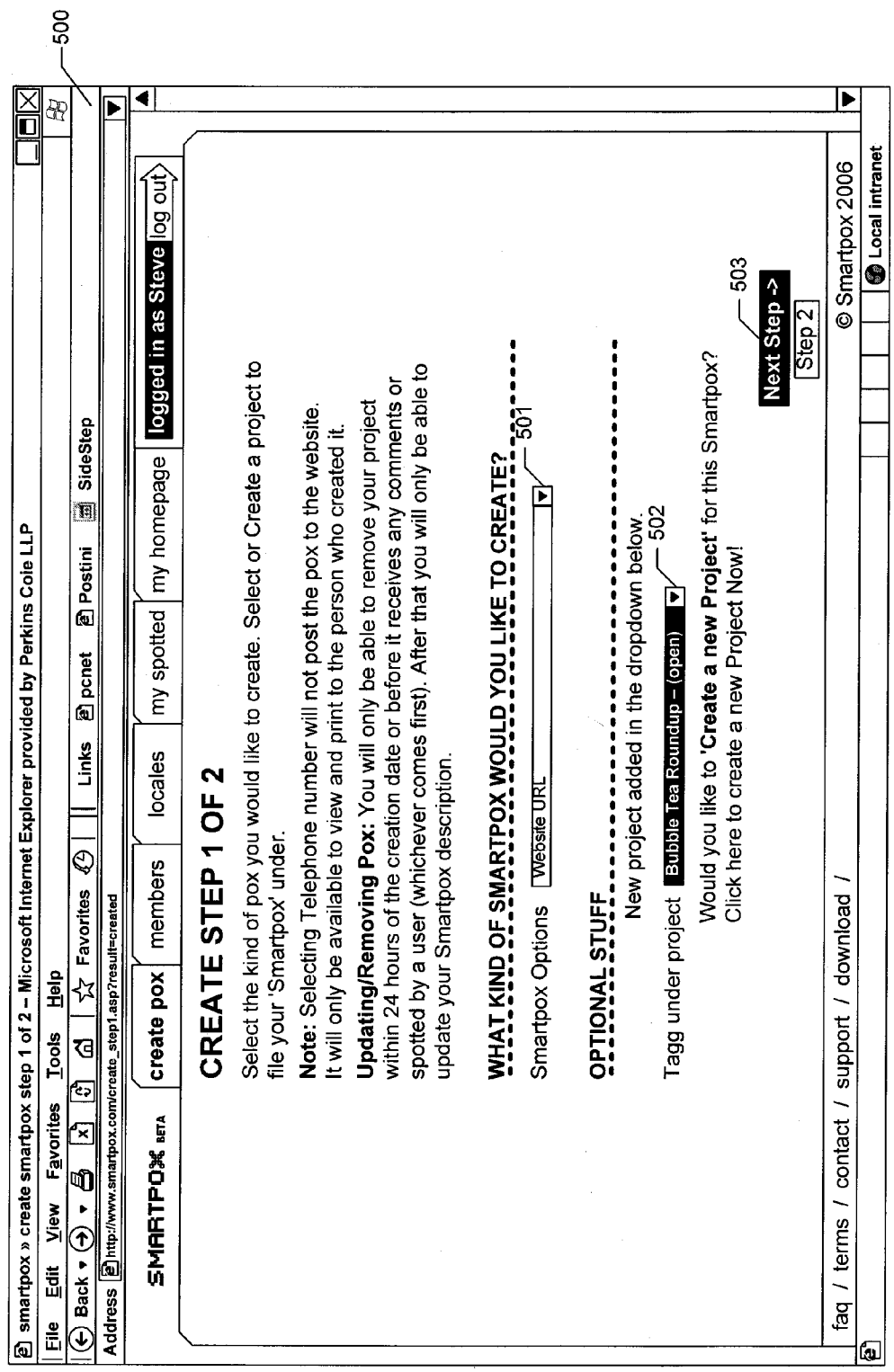

FIG. 5 shows a display presented by the facility after the user has created a new "Bubble Tea Roundup" project in FIG. 4. The display 500 shows a version of FIG. 3 in which this new project can be selected using the "Tagg under project" list box 502. The display also shows that the user has selected the "Website URL" content-type 501 for the new discussion being created. The display further includes a next step button 503 that the user may select in order to proceed to the next display for creating a new discussion.

Figure 6:
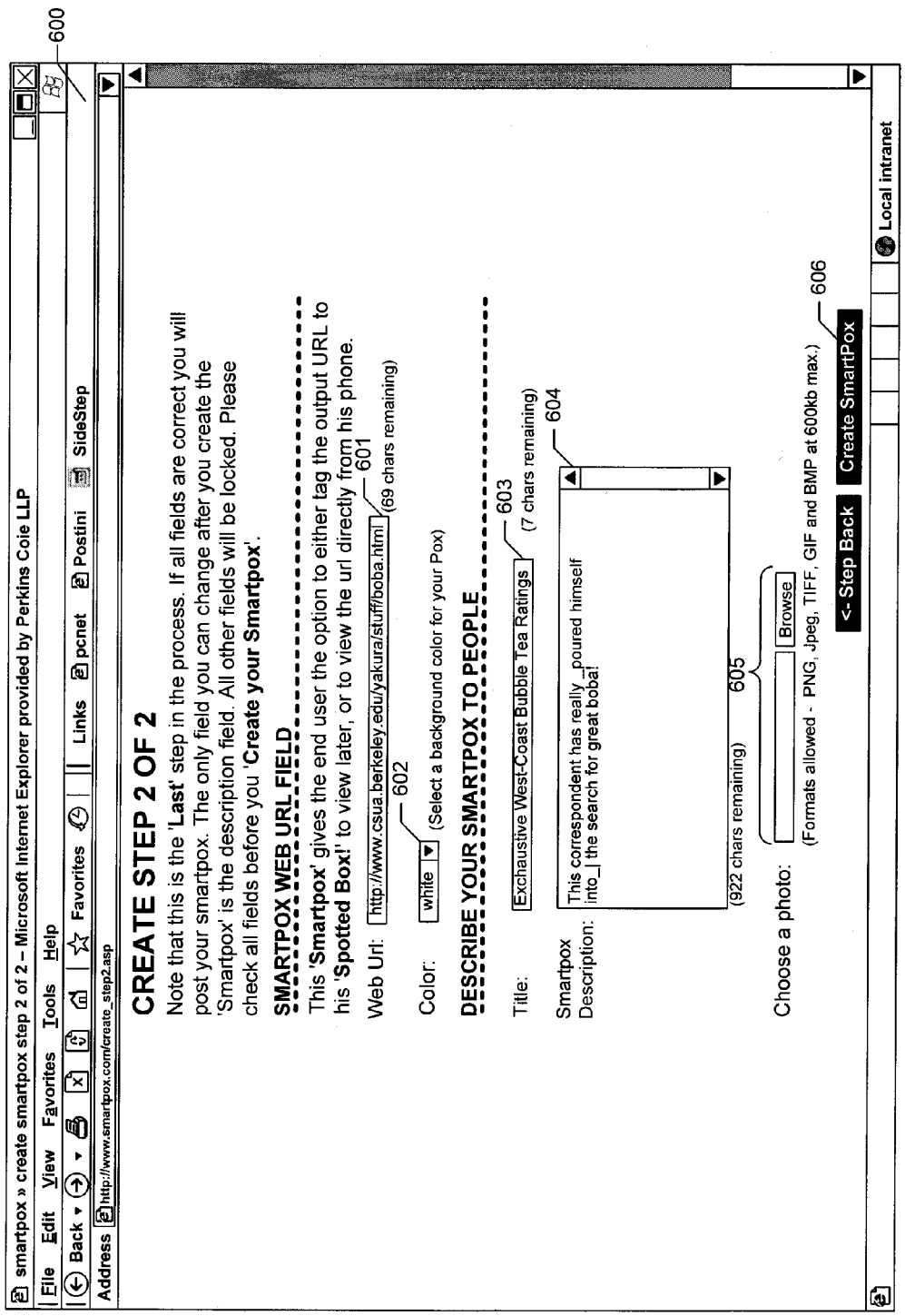

FIG. 6 shows a display presented by the facility when the user selects the next step button shown in FIG. 5. The display 600 contains additional fields and controls usable by the user in order to further define the Website URL discussion being created, including a URL specified by a user 601, a background color to use in generating a symbol for the discussion 602, a title for the discussion 603, a description for the discussion 604, and an image illustrating the discussion 605. The display further includes a create smart pox button 606 that the user may select in order to create a new discussion with the specified attributes.

Figure 7:
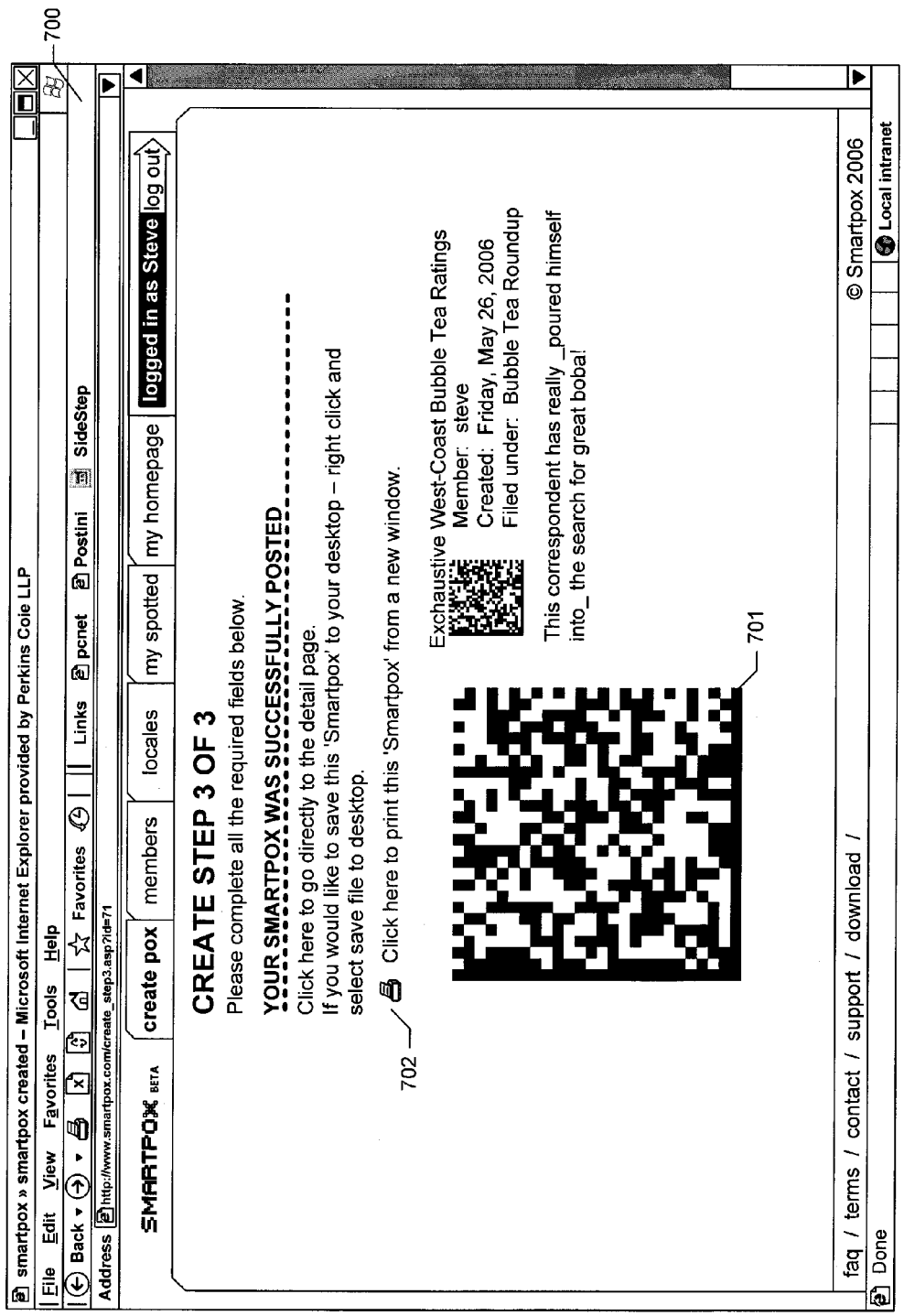

FIG. 7 shows a display presented by the facility in response to the user's selection of the create smart pox button in FIG. 6. This display 700 includes a symbol 701 generated to represent the created discussion, which the user may either print 702, save, or copy from this display onto the clipboard for pasting into an electronic document.

Figure 8:

FIG. 8 shows a display presented by the facility when the user selects the "click here to print this smart pox from a new window" link 702 in FIG. 7. The display 800 includes a send to printer button 801 that the user may select in order to print the symbol.

Figure 9:
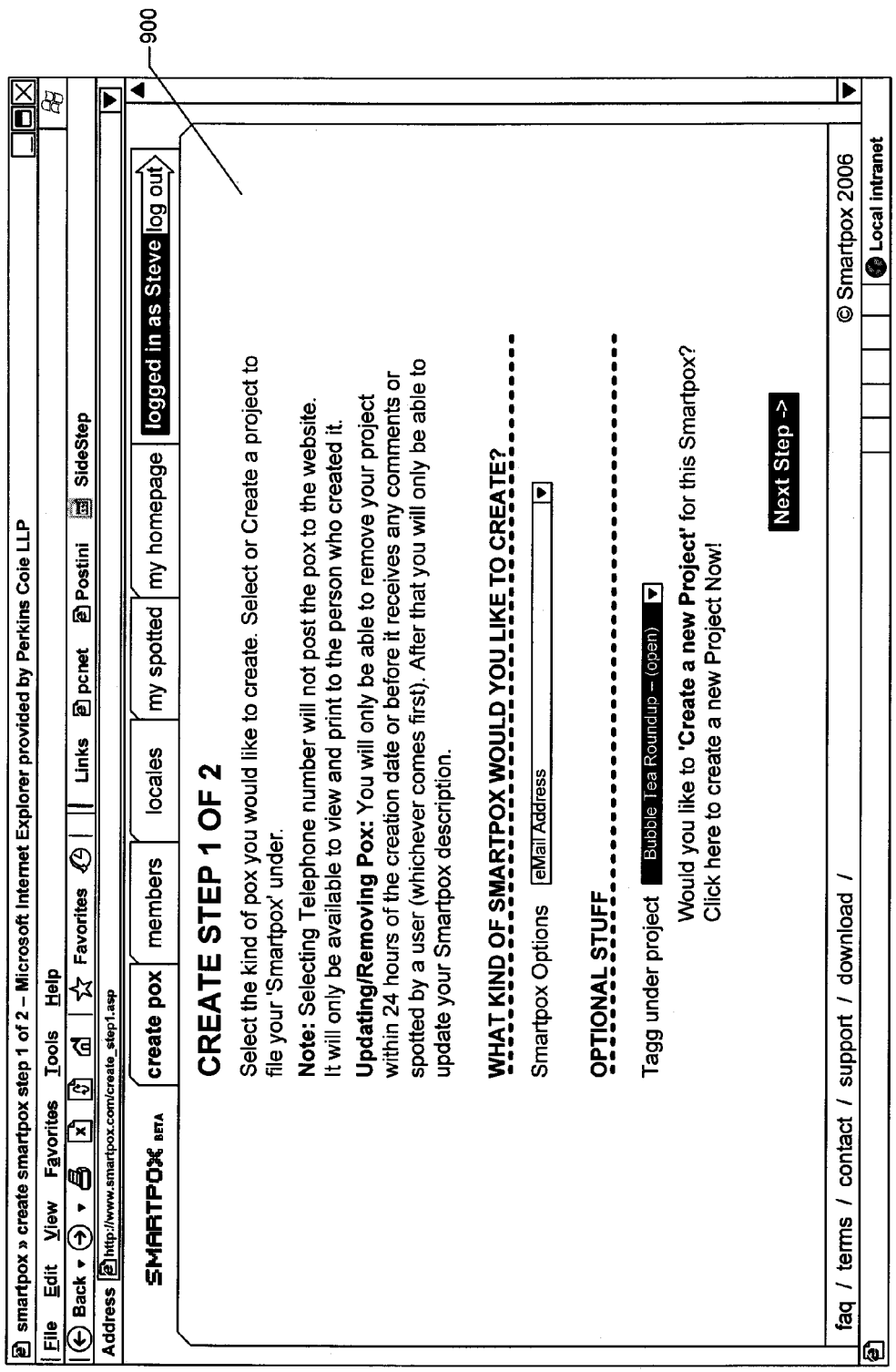
Figure 10:
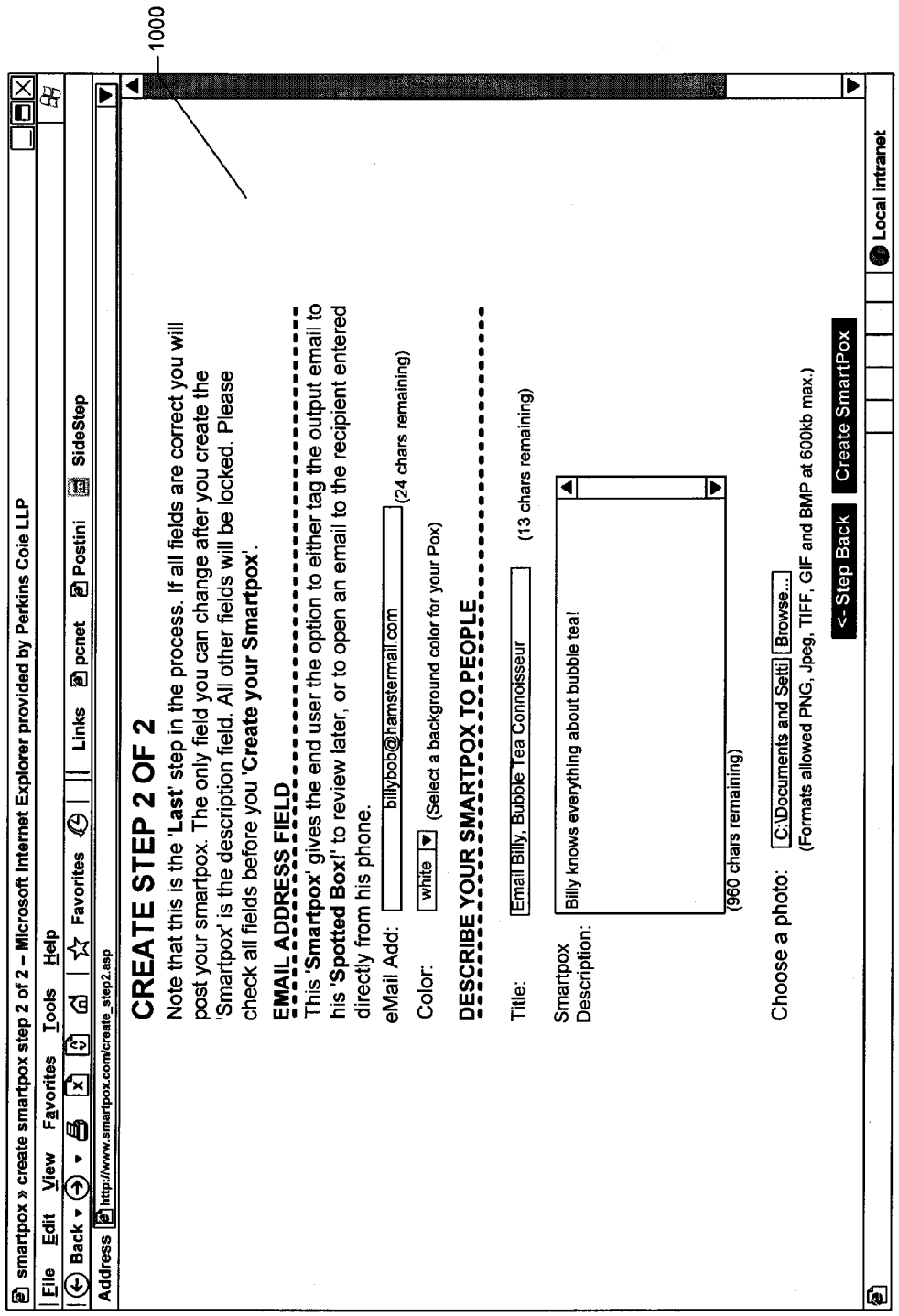
Figure 11:
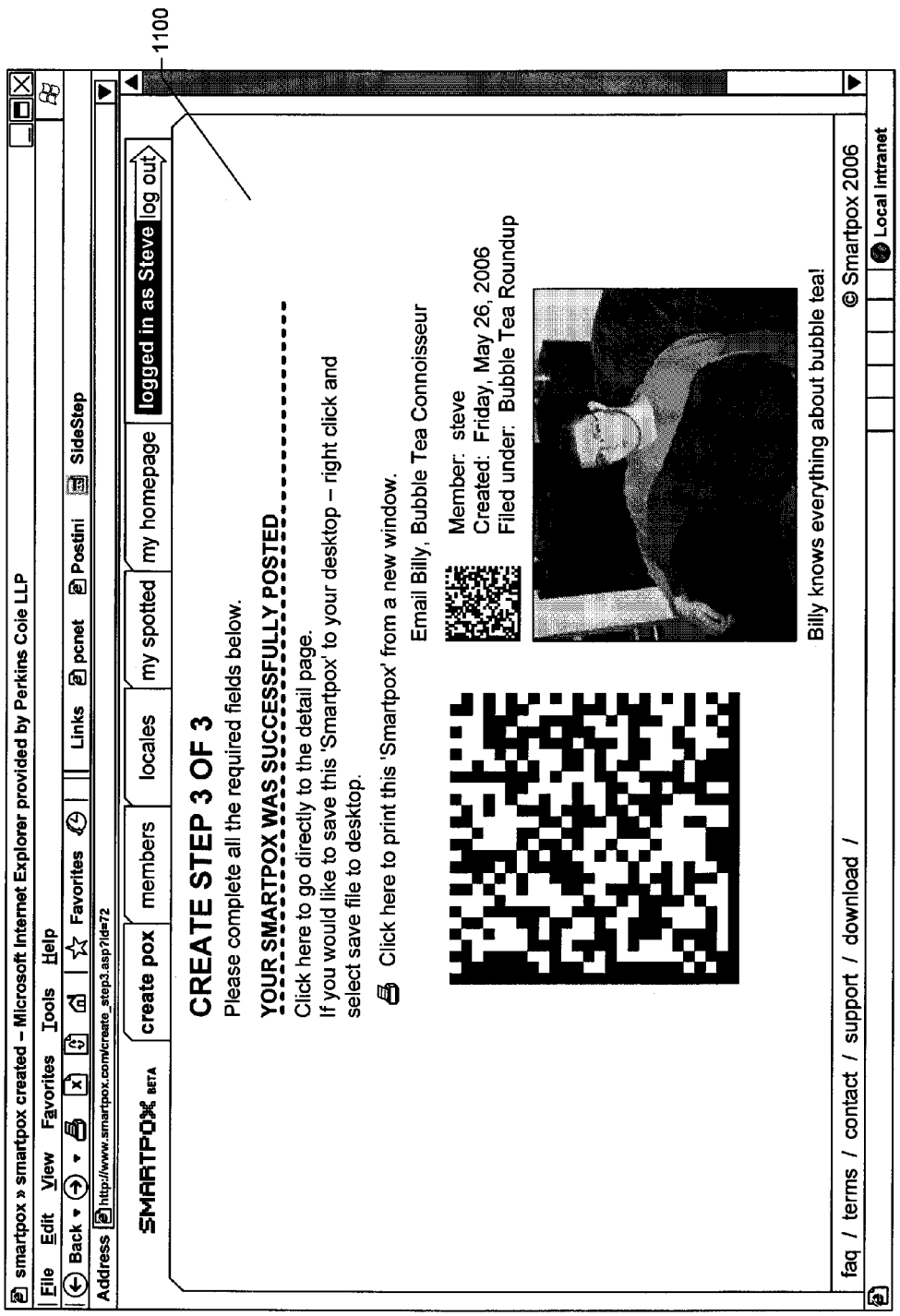

FIGS. 9-11 show displays presented by the facility as part of the process of creating a new email address discussion, whose contents are similar to the displays shown in FIGS. 5-7.

Figure 12:
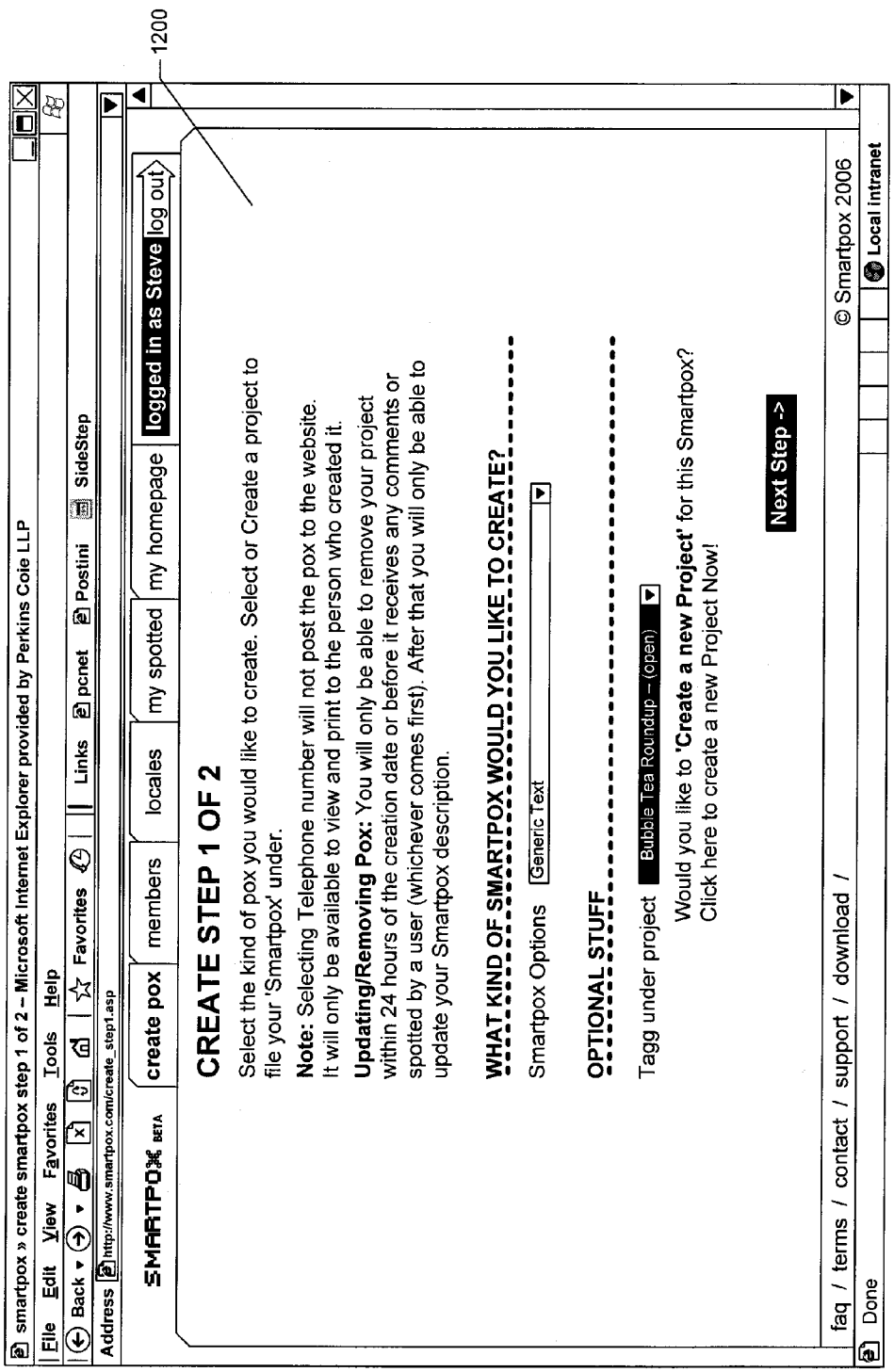
Figure 13:
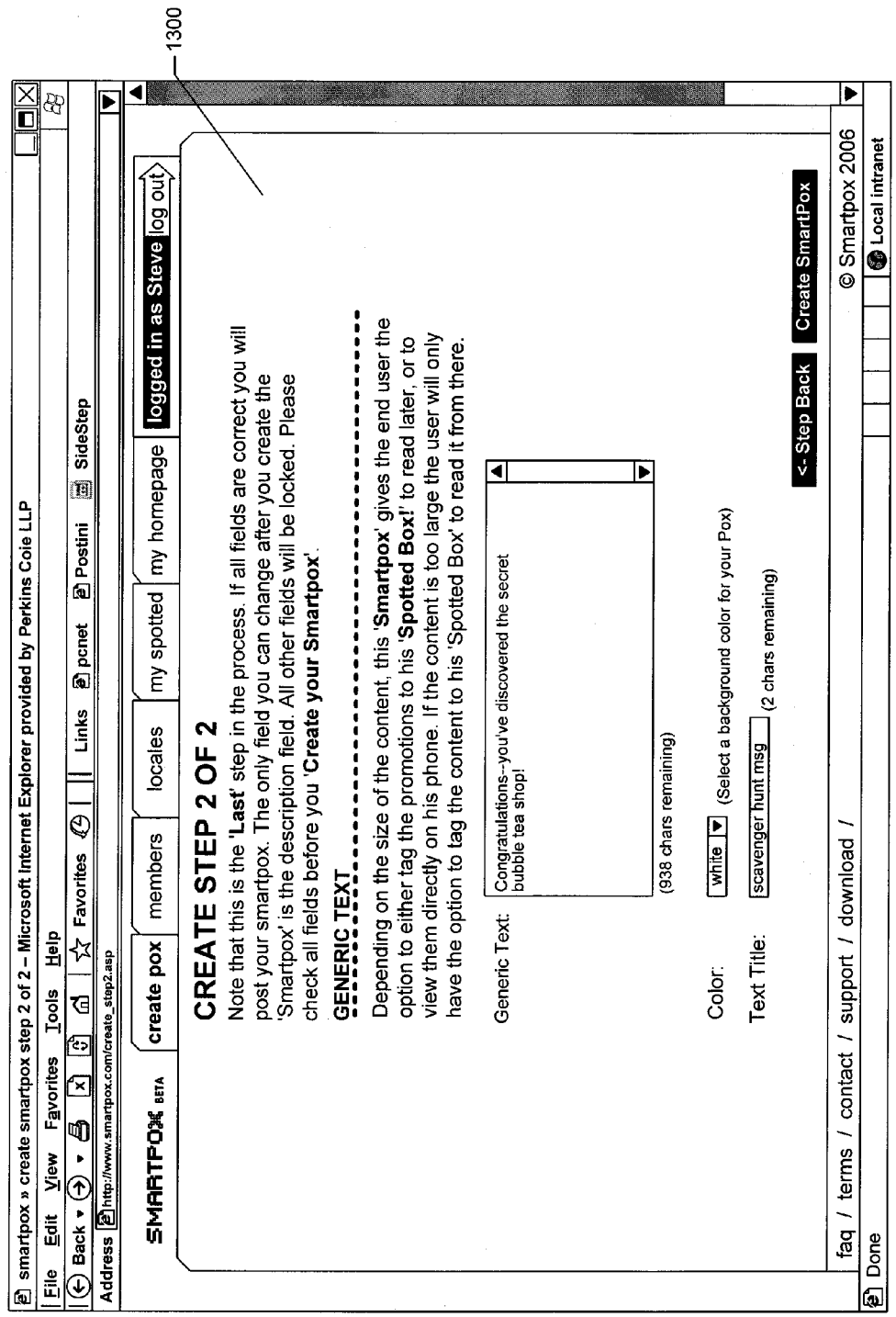
Figure 14:
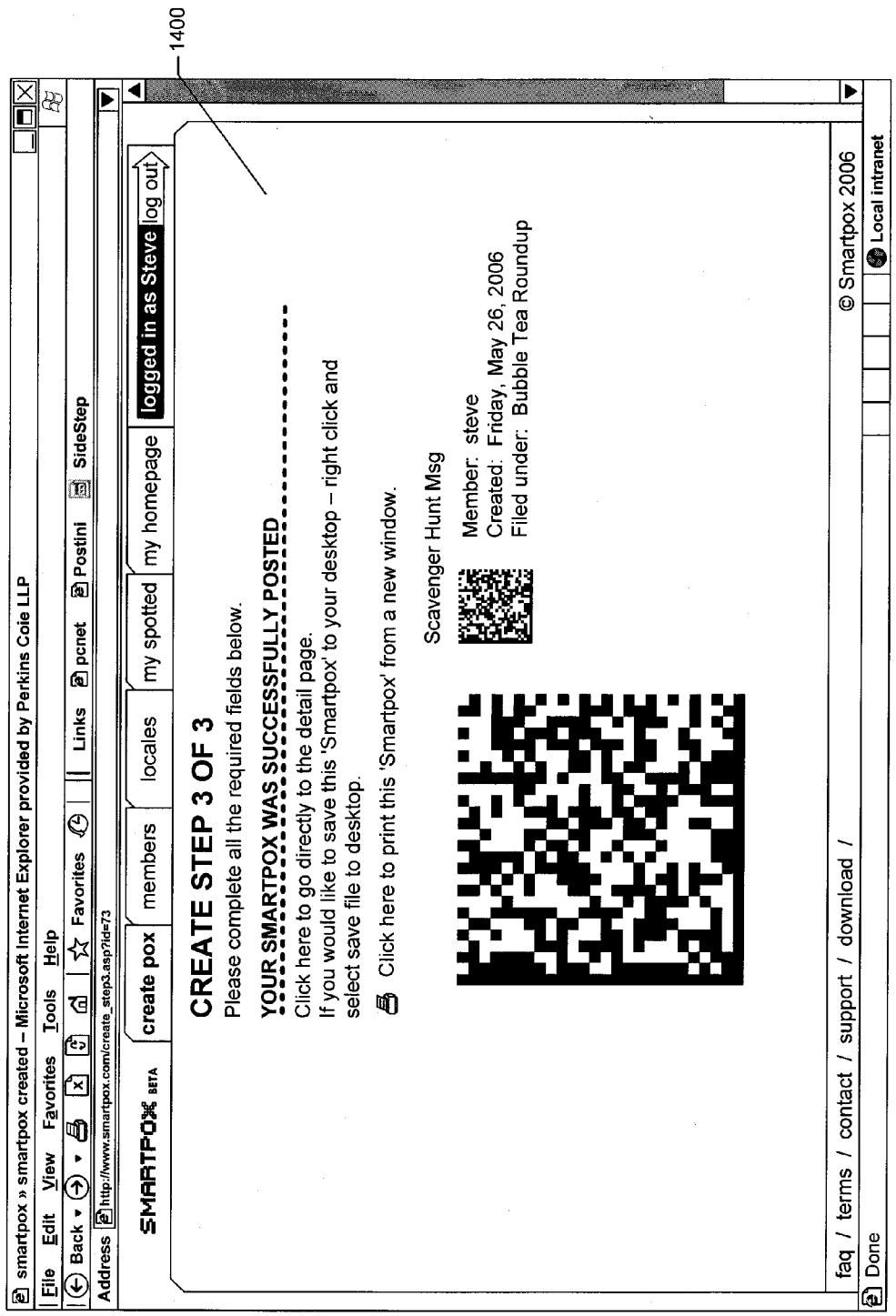

FIGS. 12-14 show displays presented by the facility as part of the creation of a new generic text discussion, whose contents are similar to the displays shown in FIGS. 5-8.

Figure 15:
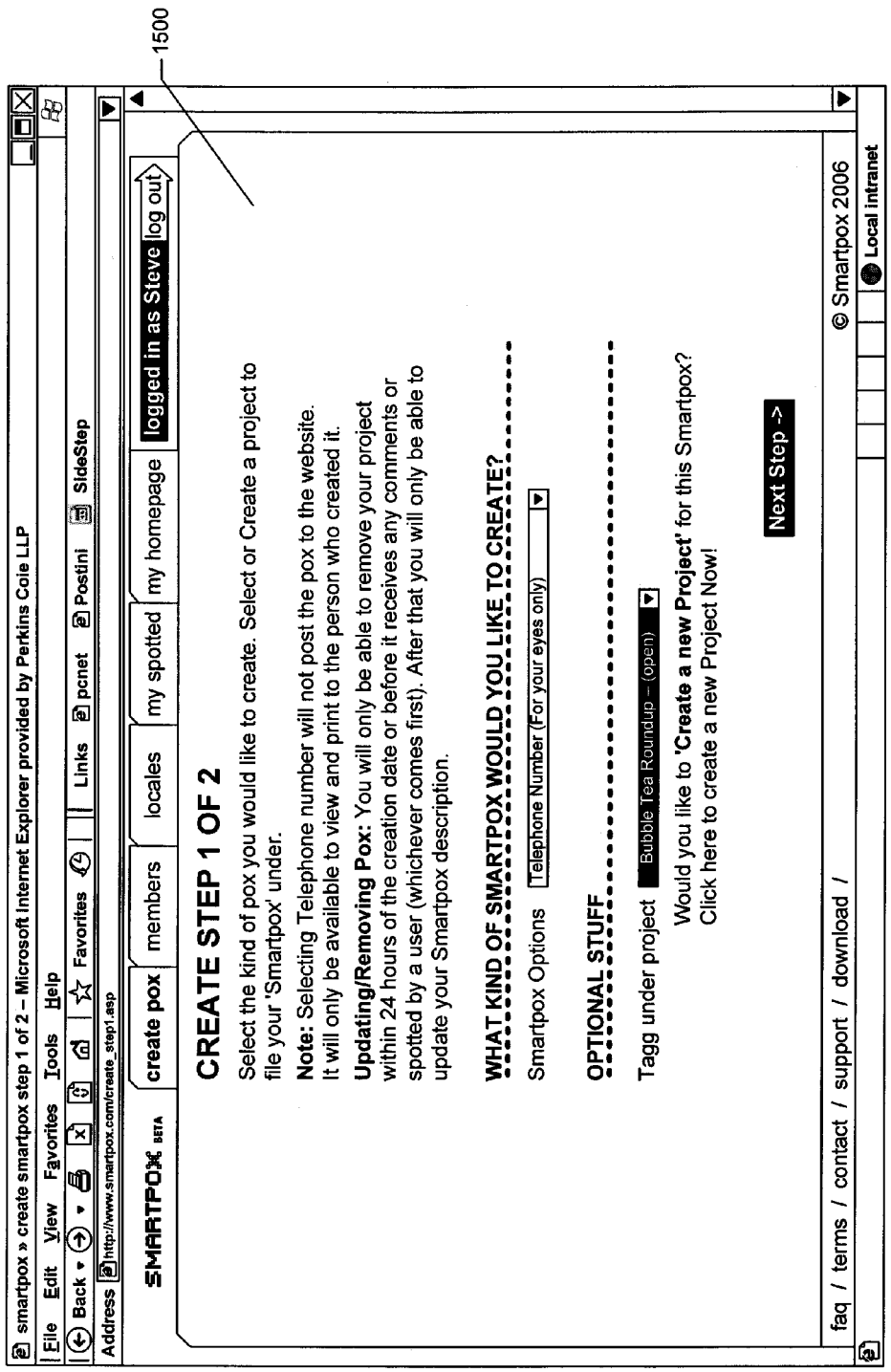
Figure 16:
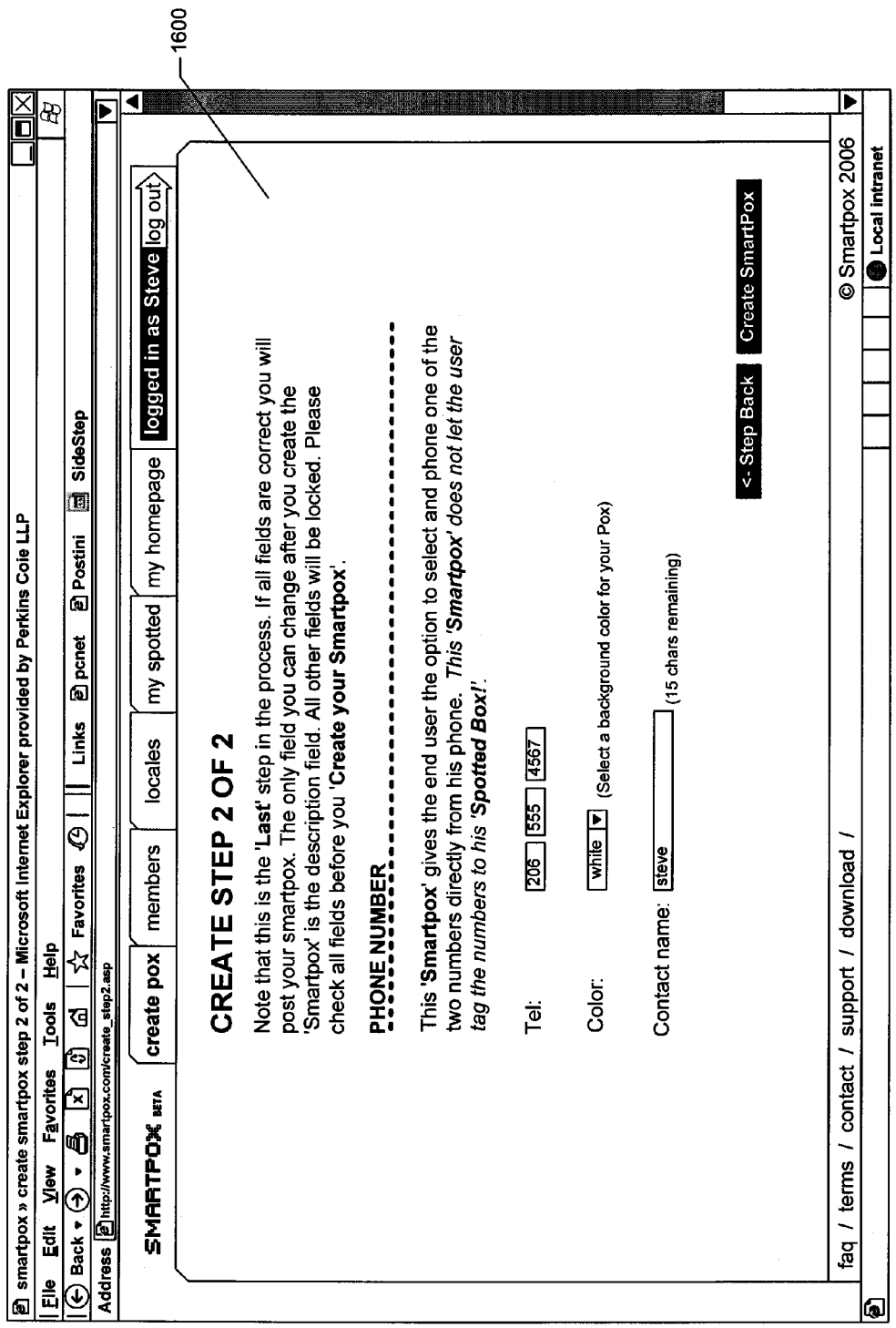
Figure 17:
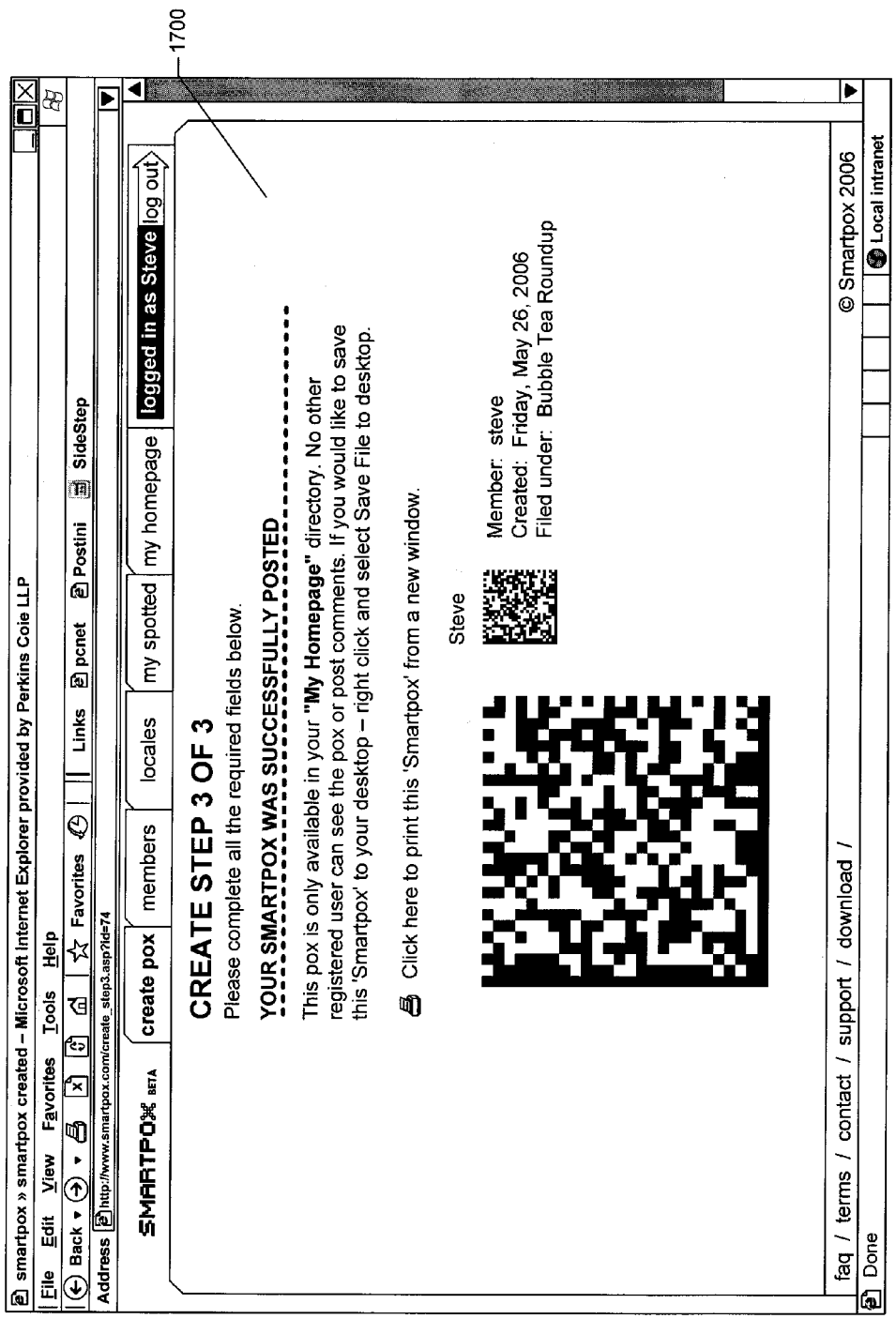

FIGS. 15-17 show displays presented by the facility as part of the creation of a telephone number discussion, whose contents are similar to the displays shown in FIGS. 5-7.

Figure 18:
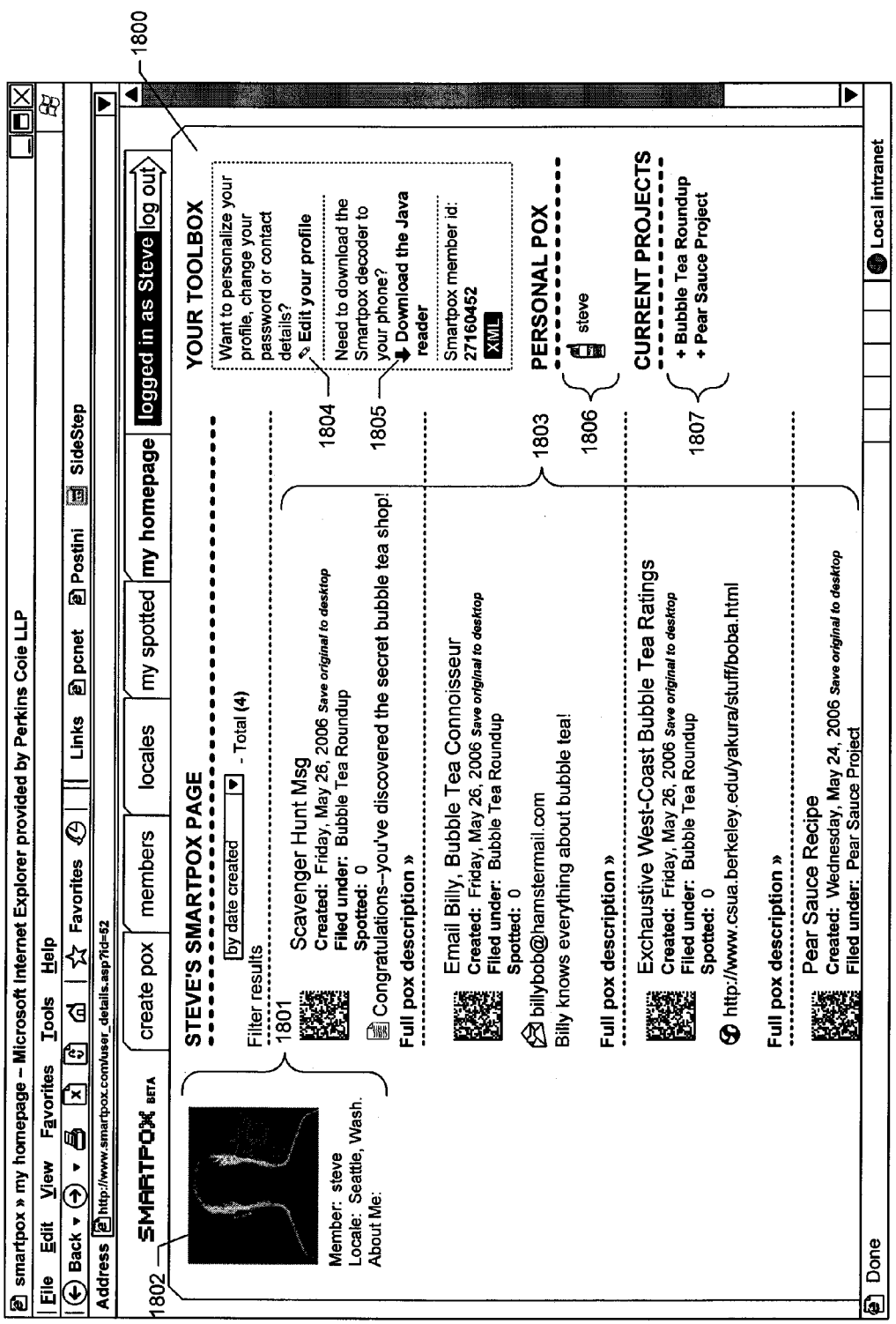

FIG. 18 shows a display presented by the facility when a user selects the "my home page" link. This display 1800 includes information 1801 about the user, in some cases including an image 1802; a list 1803 of discussions created by the user, links for editing the user's profile 1804 and downloading a smart phone symbol capture application 1805, a list of discussions or other information that will not be shared with other participants in the community 1806, and a list of projects created by the user that are active 1807.

Figure 19:
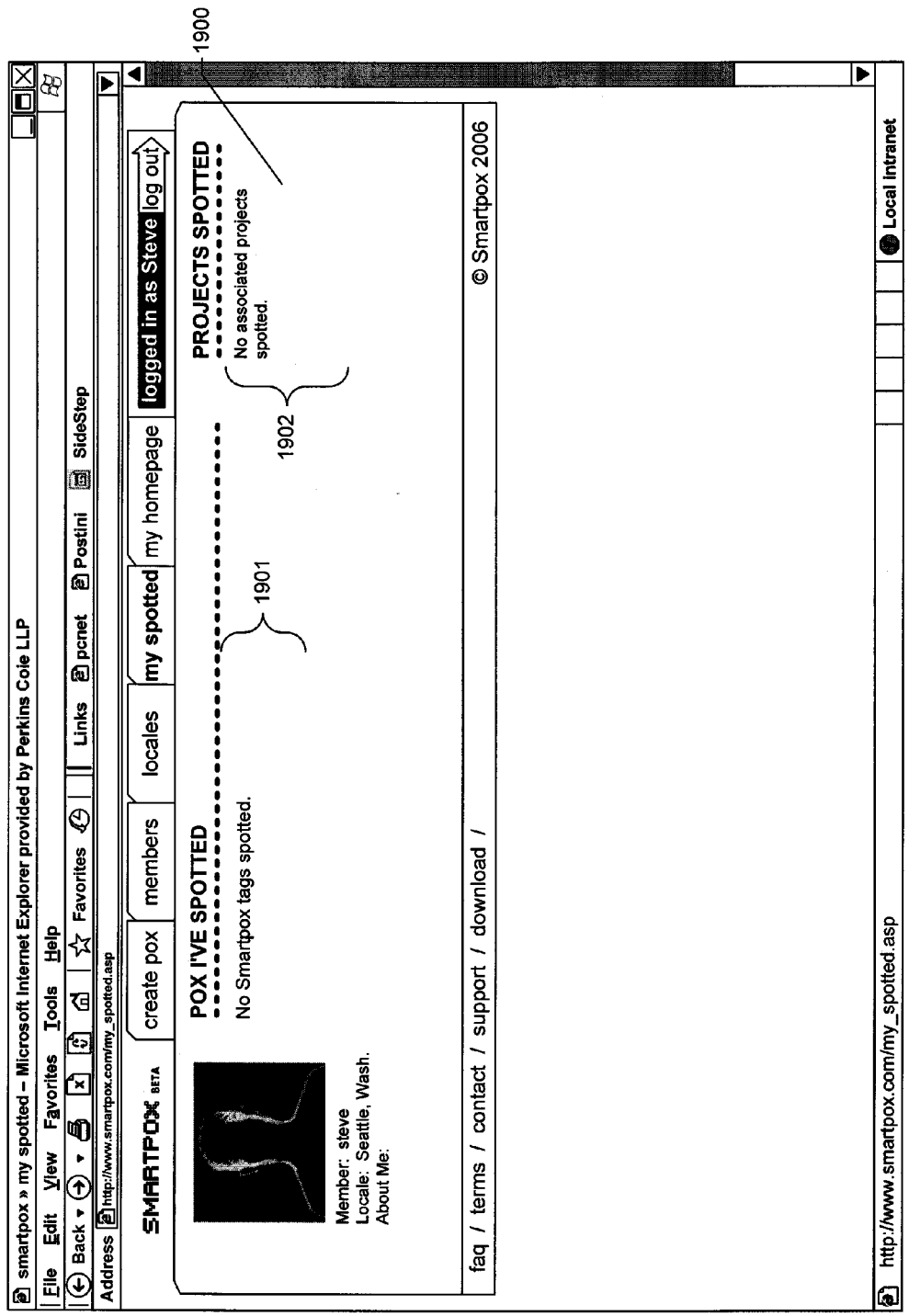

FIG. 19 shows a display presented by the facility when the user selects the "my spotted" link. The display 1900 includes a list 1901 of discussions whose symbols have been captured by the user. Where this list contains discussions, the user may select a discussion in order to view and/or participate in the discussion. The display also contains a list 1902 of projects that contain the symbols captured by the this user.

Figure 20:
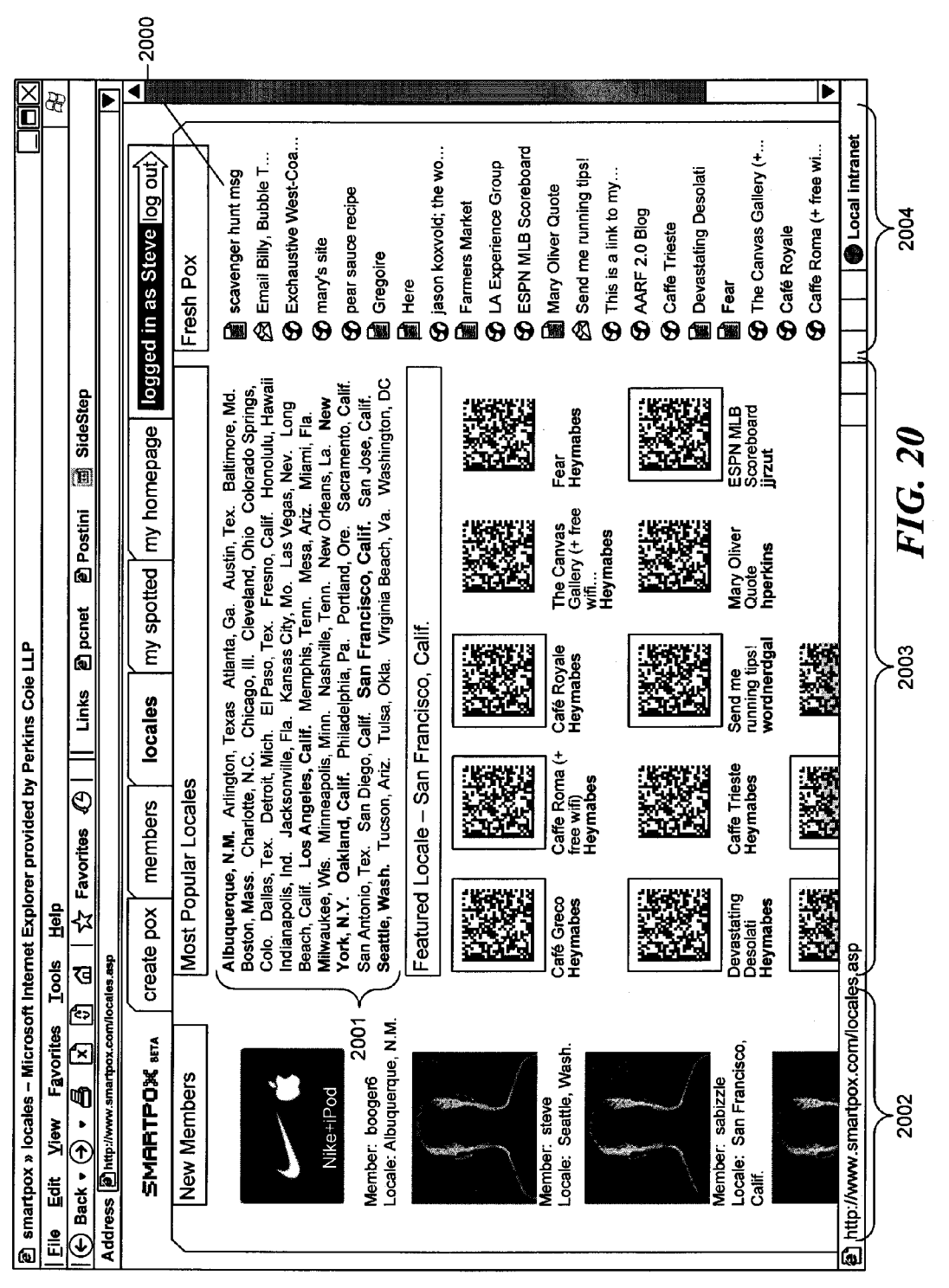

FIG. 20 shows a display presented by the facility when the user selects the "locales" link 214. This display 2000 contains a list 2001 of geographic areas. The user may select one of these areas in order to display a list of discussions relating to that area. The display also includes a list 2002 of new members, a list 2003 of discussions from a featured geographic area, and a list 2004 of recently-created or recently-updated discussions.

Figure 21:
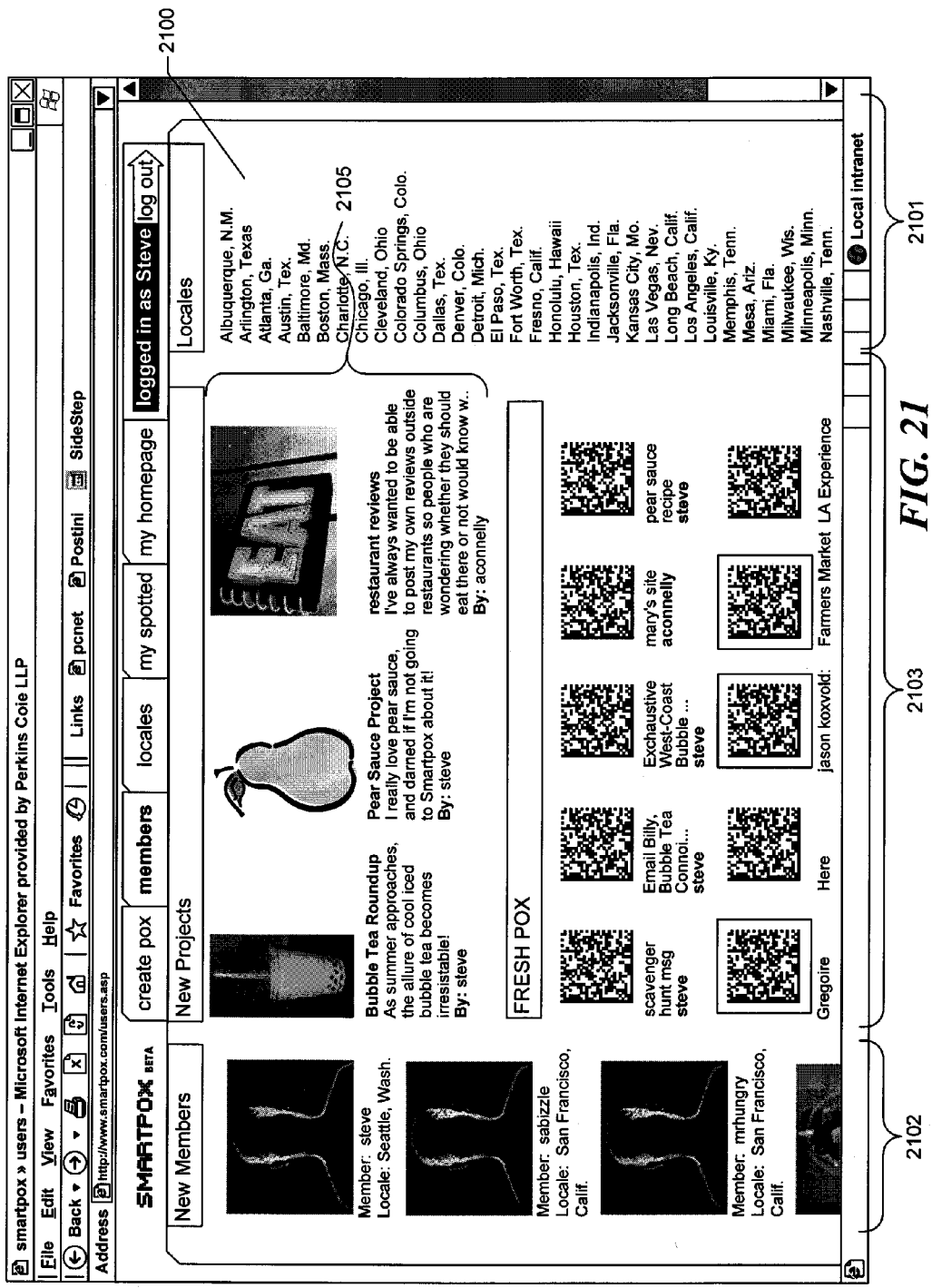

FIG. 21 shows a display presented by the facility when the user selects a "members" link. The display 2100 includes a list 2102 of new members, a list 2105 of new projects, a list of new discussions 2103, and a list of locales 2101. The user may select one of the listed locales in order to display a list of members in that locale.

Figure 22:
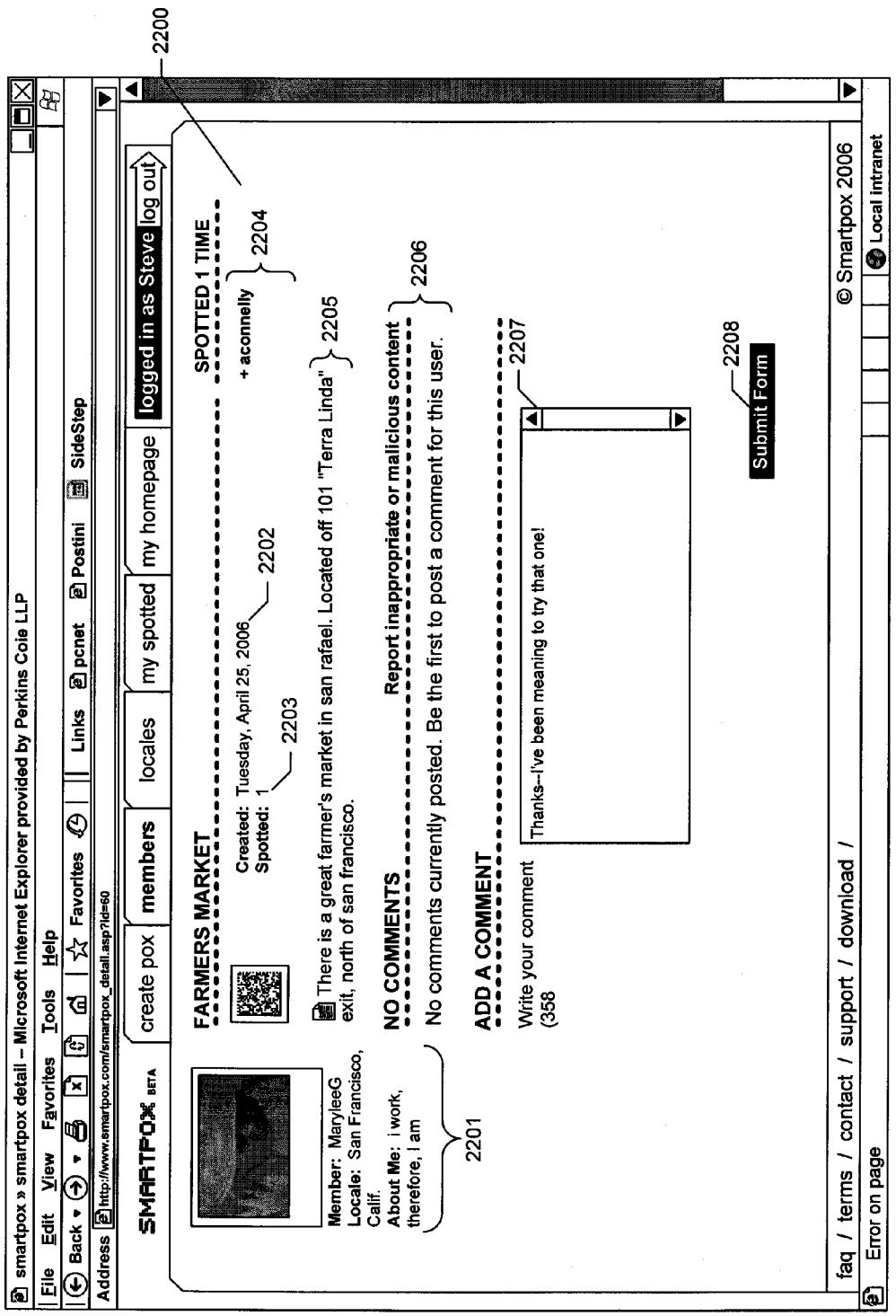

FIG. 22 shows a display presented by the facility when the user selects a "farmer's market" discussion in FIG. 21. The display 2200 includes information 2201 about the member who created this discussion, an indication of the date 2202 on which the discussion was created and the number of users 2203 who have captured the symbol for this discussion, a list 2204 of users who have captured the symbol, an original textual message provided by the user who created the discussion 2205, an (empty) list 2206 of comments posted as part of the discussion, a field 2207 that the present user may use to provide a comment as part of the discussion, and a submit form button 2208 that the user can select to submit the comments.

Figure 23:
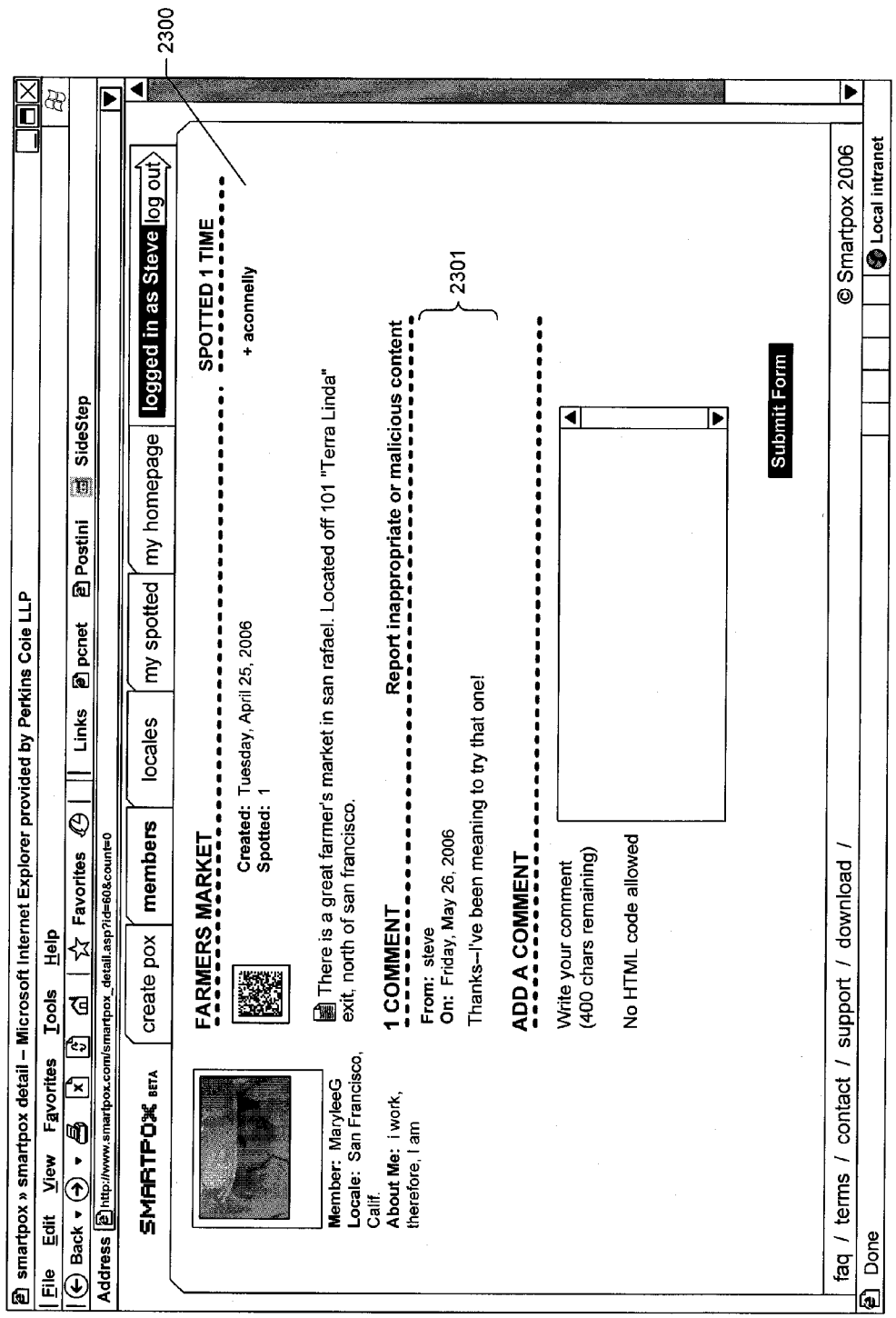

FIG. 23 shows a display presented by the facility when the user selects the submit form button in FIG. 22. This display 2300 shows that the facility has added the comment 2301 created in FIG. 22 to the discussion. In various embodiments, users can participate in a discussion in a variety of other ways, such as uploading new content of a variety of types, editing or annotating existing content for the discussion, etc.

Figure 24:
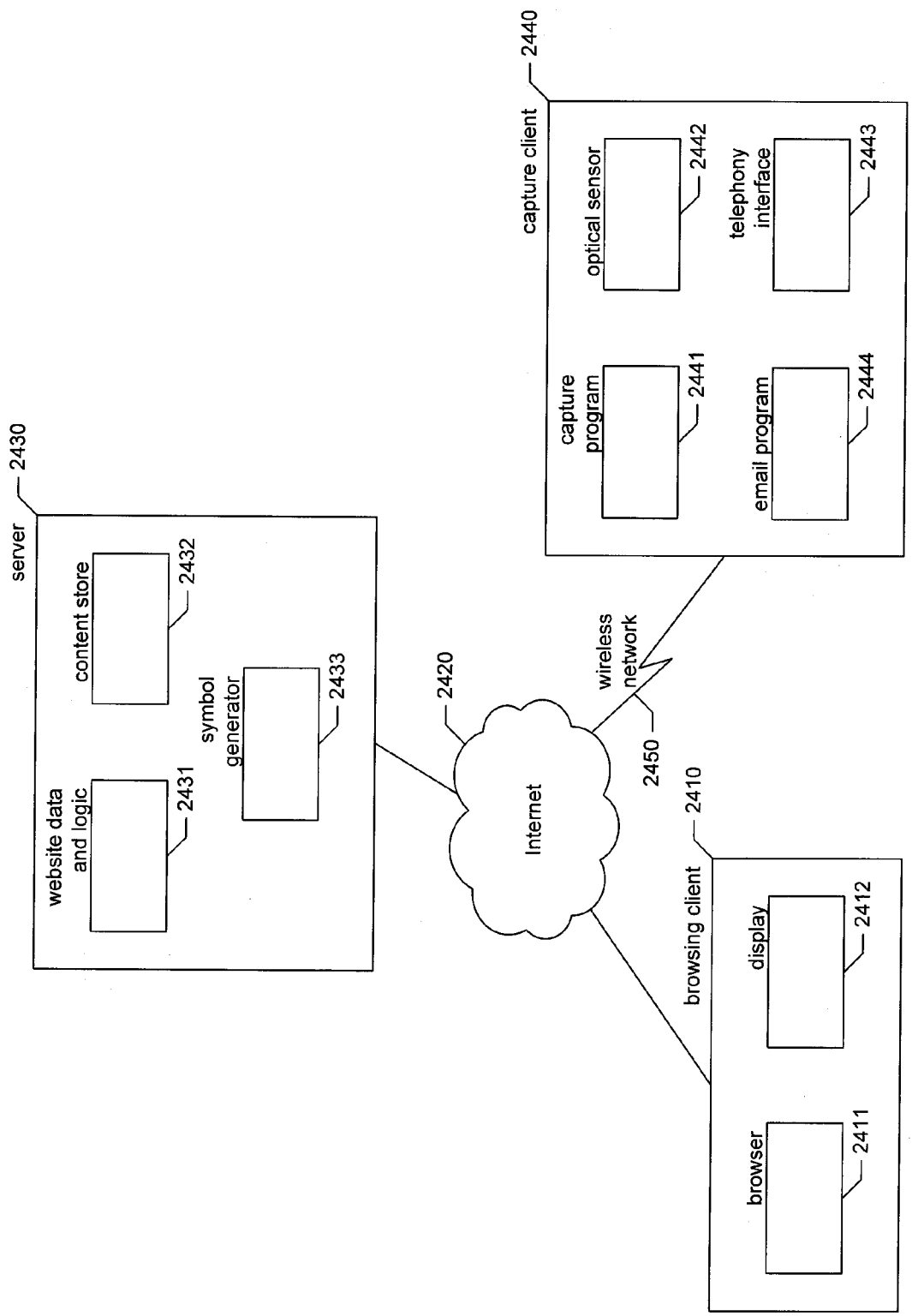
FIG. 24 is a network diagram showing some of the devices that are used in connection with some embodiments of the facility.

FIG. 24 is a network diagram showing some of the devices that are used in connection with some embodiments of the facility. A browsing client such as desktop computer, a laptop computer, a personal digital assistant, or another device capable of executing a web browser includes at least a web browser 2411 and a display 2412. A user of the browsing client can connect via the Internet 2420 to a server 2430 hosting the online community website and the facility. The server contains data and logic 2431 for the community website, a content store 2432 for content created and/or uploaded as part of a discussion, and a symbol generator module 2433 for generating computer-readable symbols. In various embodiments, the facility uses a variety of symbol generation and decoding schemes, such as the Data Matrix scheme promoted by IDAutomation.com, Inc. of Tampa, Fla. and described at idautomation.com/datamatrixfaq.html which is hereby incorporated by reference in its entirety. Various embodiments of the facility incorporate a variety of symbol generator modules, such as the Barcodesoft Data Matrix Encoder available from Barcodesoft of Scarborough, Ontario, Canada at barcode-soft.com/contact.aspx. The server permits a user of the browsing client to create a new discussion, upload content for the discussion into the content store, and use the symbol generator module to generate a symbol identifying the discussion. The user can then make rendered copies of the generated symbol available for other users of the community to capture using a capture client 2440.

The capture client, such as a cellular phone, PDA, etc., has installed on it a capture program 2441 available from the community website. A user of the capture client executes the capture program to use an optical sensor 2442 included in the capture client to capture an image of a rendered symbol representing a discussion, decode the symbol, and take some action in response. For many discussions, the capture program uses a wireless network 2450 to send to the server via the Internet an indication that the user associated with the capture client has captured the symbol for a particular discussion. In some embodiments, this indication sent by the capture client to the server includes the user's user name to associate the indication with the user or another identifier for the user generated by or in connection with the facility. In other embodiments, the facility uses other information to associate the indication with the user, such as the telephone number of the phone, or a hardware identifier or serial number of the phone or a component thereof. When the server receives the indication, it stores the indication, which is then available both via the user's user page, and via the discussion page for the captured symbol. In some embodiments, the user may use the capture client to go on to immediately participate in the discussion corresponding to the captured symbol. In cases where the capture program is used to capture a symbol having contents that are immediately actionable by the capture client, the capture program automatically causes this action to proceed, or prompts the user as to whether the user wishes this action to proceed. For example, where a telephone number is encoded in a captured symbol, the capture program causes a telephony interface 2443 of the capture client to dial the telephone number. Similarly, where the symbol encodes an email address, the capture program causes an email program 2444 installed on the capture client to address a new email message to the encoded address. Also, by virtue of the fact that the captured symbol and its discussion is noted by the facility on the capturing user's user page, the user may instead visit that user page at a future time, using either the capture client or the browsing client, to take actions associated with the symbol and/or its discussion.

Figure 25:
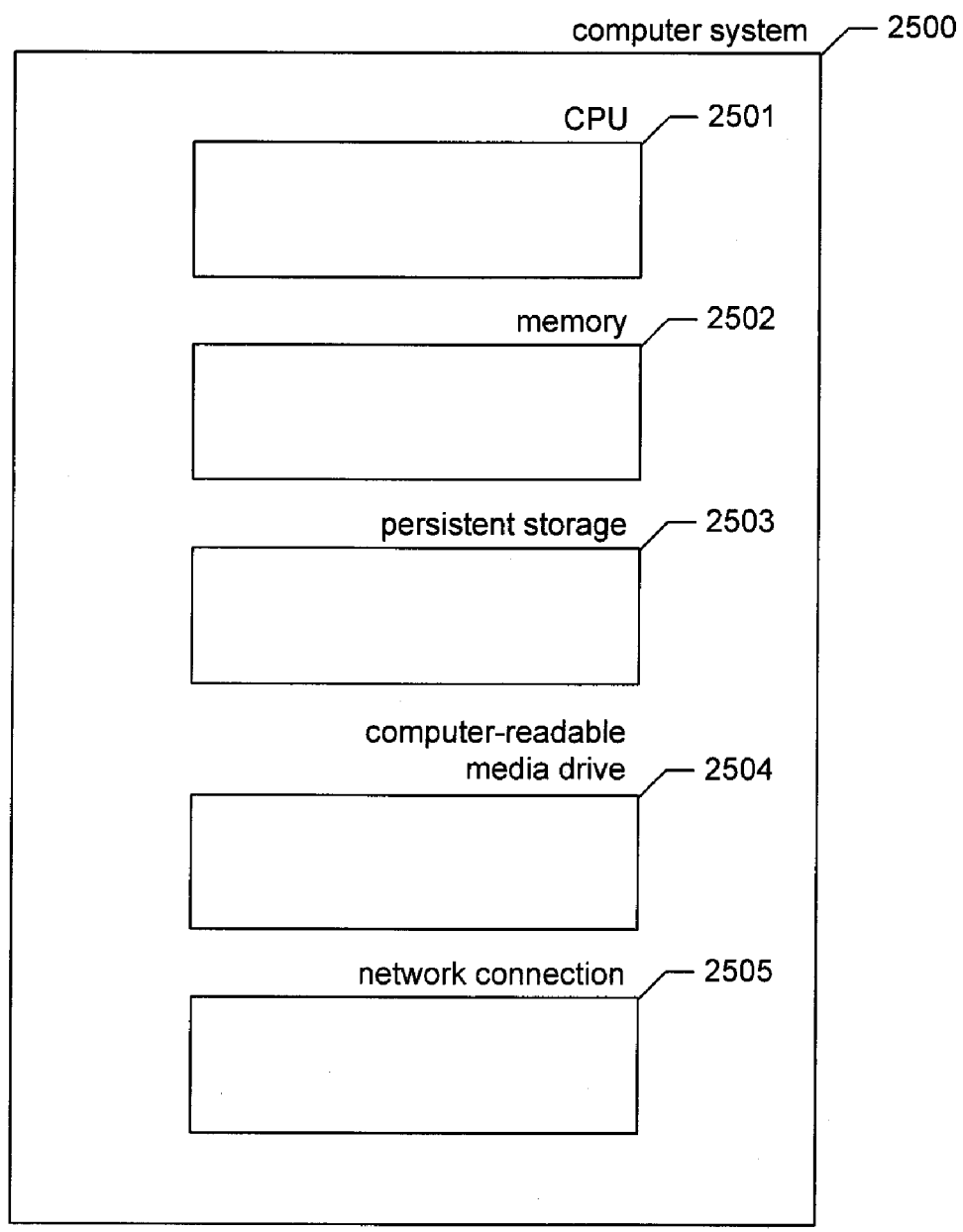
FIG. 25 is a block diagram showing some of the components typically incorporated in at least some of the computer systems and other devices on which the facility executes.

FIG. 25 is a block diagram showing some of the components typically incorporated in at least some of the computer systems and other devices on which the facility executes. These computer systems and devices 2500 may include one or more central processing units ("CPUs") 2501 for executing computer programs; a computer memory 2502 for storing programs and data—including data structures, database tables, other data tables, etc.—while they are being used; a persistent storage device 2503, such as a hard drive, for persistently storing programs and data; a computer-readable media drive 2504, such as a CD-ROM drive, for reading programs and data stored on a computer-readable medium; and a network connection 2505 for connecting the computer system to other computer systems, such as via the Internet, to exchange programs and/or data—including data structures.

In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components.

A description of the user's interaction with the community in some embodiments of the facility follows.

A user signs up as a member of the community using its website. The user is sent a sign up confirmation code to the phone number entered. Upon receiving the code on his or her mobile phone, the user enters the code on the site.

The user then downloads the Smartpox phone application to his phone. Upon successful installation the user runs the application and is prompted for his user id. His member id was generated by the facility based on his profile at the community website.

After entering his 6-digit member id on his phone, the Smartpox phone application restarts and is now fully personalized based on the user's site profile.

When the user spots a Smartpox code out in the world, the user launches the Smartpox phone application and decodes the Smartpox with the phone reader. When the phone detects a Smartpox code, it will prompt the user with options based on the kind of data that was encoded from the community website.

The type/kind of data can be summed up in 2 approaches: 1) The data is presented upon successful decoding; 2) The user is given the option to 'tag' the decoded data to his or her user page at the community website.

If the type of data is 'static,' the facility displays it directly on the phone, without the need to go online to retrieve the remaining data or personalized data.

When the user selects the option to lag' this data to his the community website profile, the user's phone will connect to smartpox.com and verify the user's member id and link the data from the user's phone with the data on the site. The user will then be giving the option to view to content/data or to disconnect.

At any/all given times, the community website is aware of exactly who 'spotted/captured/decoded' data that was linked back to the community website from the members phone. This is due to the Smartpox client having been paired with the members profile on the community website. The phone client has the capability to both push and pull data personalized or anonymously from the community website.

The client can be installed directly from the phone or my transferring it from the user's laptop/desktop workstation after the user downloads it.

In some embodiments, the facility can present advertising messages to a user based on the set of symbols that the user has captured, other actions performed by the user in connection with the community generated by the facility and/or user registration information. For example, a user who has captured a symbol relating to an ultimate Frisbee tournament might receive an advertising message promoting a new flying disc model; a user who has captured a symbol relating to a gourmet cooking group and who has selected San Francisco as his or her locale during registration may receive an advertising message for a San Francisco kitchen equipment store; and a user who has captured a symbol for a Shinto discussion group and commented in a discussion about anime may receive an ad for Japan travel services. The facility may present these ads via the capture client, within the context of the community website, or via some other channel. The facility may present advertising messages directly in response to a user action that qualifies the user to receive an advertising message, or at some later time.

In some embodiments, the capture client generates and/or displays its own symbols, for capture by another user of the community, or by a related party such as a cashier at a store. In some embodiments, the facility uses this capability to generate machine-readable coupons, admission tickets, arcade credits, etc. on a user's behalf.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for supporting an online discussion, comprising:
   using a distinguished handheld device that is associated with a distinguished user to capture an image of a machine-readable symbol encoding an identifier for a distinguished online discussion;
   wirelessly transmitting a notification containing a copy of the identifier decoded from the captured symbol from the device for delivery to a server;
   in response to receiving the notification in the server, storing an indication of the capture identifying the distinguished user and the distinguished online discussion; and
   in response to the stored indication, displaying in an online forum hosting the distinguished online discussion a visual indication that the distinguished user has captured the symbol for the distinguished online discussion.

2. The method of claim 1, further comprising:
   receiving from an initiating user initial content to include in the distinguished online discussion;
   assigning the identifier to the distinguished online discussion;
   storing the received initial content in connection with the assigned identifier; and
   encoding the identifier into the machine-readable symbol to permit the initiating user to make one or more copies of the machine-readable symbol available for users to capture.

3. The method of claim 1 wherein the displayed visual indication is a name by which the distinguished user is known.

4. The method of claim 1 wherein the displayed visual indication is a count of the unique users who have captured the symbol that has been incremented to include the distinguished user.

5. The method of claim 1 wherein the transmitted notification further contains information identifying the distinguished user.

6. The method of claim 5 wherein the information identifying the distinguished user is an identifier entered into the handheld device by the distinguished user.

7. The method of claim 5, further comprising installing a program on the distinguished handheld device that initiates the transmitting,
   and wherein the information identifying the distinguished user is stored in the handheld device as part of the installation of the program.

8. The method of claim 5 wherein the information identifying the distinguished user is a hardware identifier for a component of the handheld device.

9. The method of claim 5 wherein the information identifying the distinguished user is a hardware identifier stored in a SIM card installed in the handheld device.

10. The method of claim 5 wherein the information identifying the distinguished user is a telephone number associated with the handheld device.

11. The method of claim 1, further comprising:
    in response to the indication, selecting from a plurality of advertising messages an advertising message as being relevant to the distinguished online discussion; and
    presenting the selected advertising message to the distinguished user.

12. The method of claim 11 wherein the selected advertising message is presented to the user via the handheld device.

13. The method of claim 11 wherein the selected advertising message is presented to the user in the online forum.

14. The method of claim 1, further comprising, in response to the stored indication, displaying in a user page for the distinguished user associated with the online forum a visual indication that the distinguished user has captured the symbol for the distinguished online discussion.

15. The method of claim 14, further comprising:
    displaying in a user page for the distinguished user associated with the online forum, in connection with the visual indication that the distinguished user has captured the symbol for the distinguished online discussion, a visual indication that a distinguished action is associated with the symbol for the distinguished online discussion;
    receiving an indication that the distinguished user has selected the visual indication that a distinguished action is associated with the symbol for the distinguished online discussion; and
    in response to the selection, performing the distinguished action on behalf of the distinguished user.

16. A computer-readable medium whose contents cause a computing system to perform a method for coordinating an online discussion, the method comprising:
    receiving an indication that a distinguished user has captured a machine-readable symbol encoding an identifier that identifies a distinguished online discussion; and
    incorporating into an online forum that hosts the distinguished online discussion an indication that the distinguished user captured a machine-readable symbol encoding an identifier that identifies the distinguished online discussion.

17. The computer-readable medium of claim 16 wherein the method further comprises providing to the distinguished user an opportunity to contribute to the distinguished online discussion in the online forum that hosts the distinguished online discussion.

18. A wireless handset, comprising:
    a symbol capture subsystem for visually capturing an image of a machine-readable symbol encoding data;
    a symbol decoding subsystem that processes the captured image to discern data encoded into the symbol; and
    an action determination subsystem that transforms the data discerned by the symbol decoding subsystem into an action specified by the data; and
    an action performance subsystem that invokes the action specified by the data.

19. The wireless handset of claim 18, further comprising a telephony subsystem that places a call to a distinguished telephone number specified by the data in response to invocation by the action performance subsystem.

20. The wireless handset of claim 18, further comprising a web client that retrieves a web page specified by the data in response to invocation by the action performance subsystem.

21. The wireless handset of claim 18, further comprising a logging subsystem that transmits a message from the wireless handset in response to invocation by the action performance subsystem that, when received by a computer system, causes the computer system to log the capture of the signal by a user associated with the wireless handset.

22. The wireless handset of claim 18, further comprising a promotion subsystem that transmits a message from the wireless handset in response to invocation by the action performance subsystem that, when received by a computer system, causes the computer system to generate a marketing promotion for use in connection with the wireless handset.

23. The wireless handset of claim 22, further comprising a display subsystem that displays information about the generated marketing promotion in natural language.

24. The wireless handset of claim 22, further comprising a display subsystem that displays a machine-readable symbol conveying information about the generated marketing promotion.

25. A computer memory containing a symbol data structure, comprising visual information representing a machine-readable symbol encoding an identifier for a particular topical discussion,
such that the represented machine-readable symbol may be visually captured to join the discussion.

26. A communication network conveying a generated data signal, the data signal comprising:
a content identifier decoded from a machine-readable symbol representing a discussion; and
a user identifier identifying a user who visually captured the machine-readable symbol,
such that a receiver of the data signal may log the capture of the machine-readable symbol by the user.

27. The communication network of claim 26 wherein the data signal is transmitted from a wireless handset by a program installed on the wireless handset, and wherein the user identifier was stored in the handset as part of the installation of the program.

\* \* \* \* \*